Dec. 3, 1957     A. H. DAWSON, JR     2,815,190
PROCESS AND APPARATUS FOR PREVENTING LOSS
OF CIRCULATION OF DRILLING FLUID
Filed March 30, 1953     4 Sheets-Sheet 1
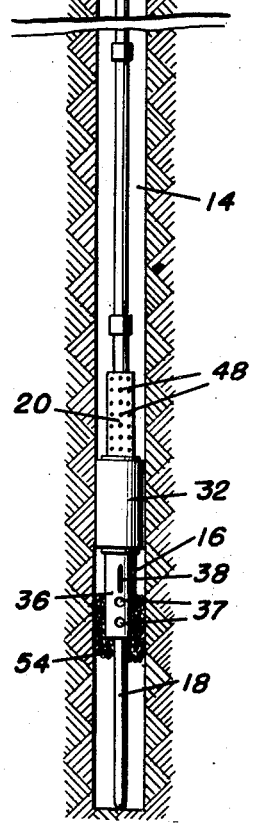
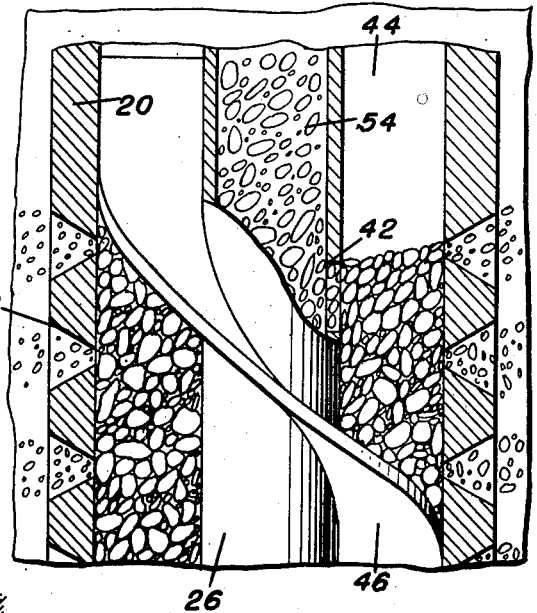
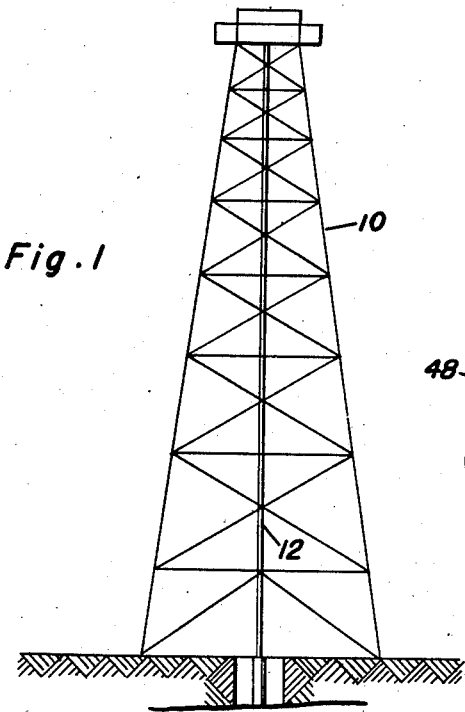
Arden H. Dawson, Jr.
INVENTOR.
BY
Attorneys Dec. 3, 1957 A. H. DAWSON, JR 2,815,190
PROCESS AND APPARATUS FOR PREVENTING LOSS
OF CIRCULATION OF DRILLING FLUID
Filed March 30, 1953 4 Sheets-Sheet 2

Arden H. Dawson, Jr. INVENTOR.

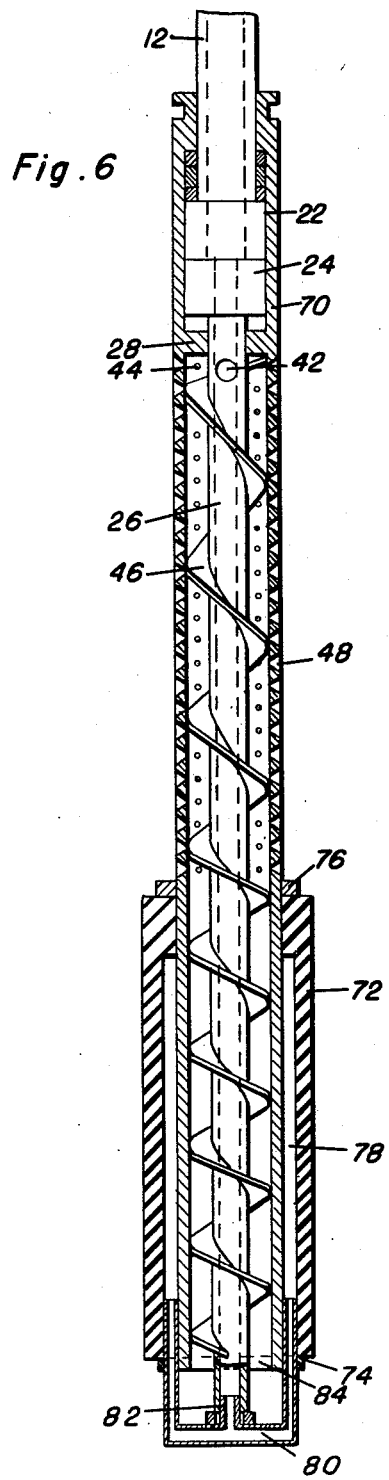
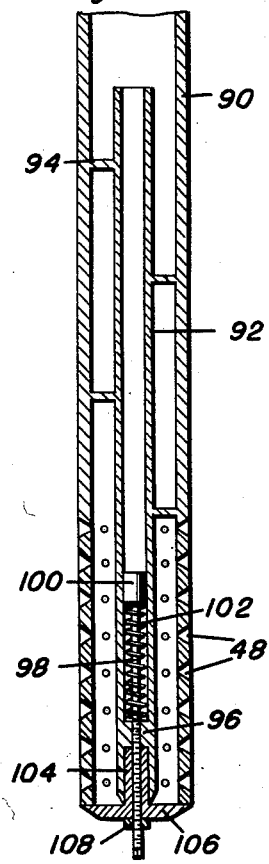
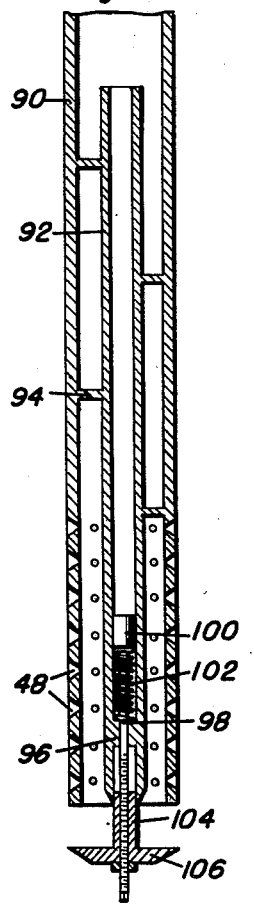
Fig. 6
Fig. 7
Fig. 8
Arden H. Dawson, Jr.
INVENTOR.

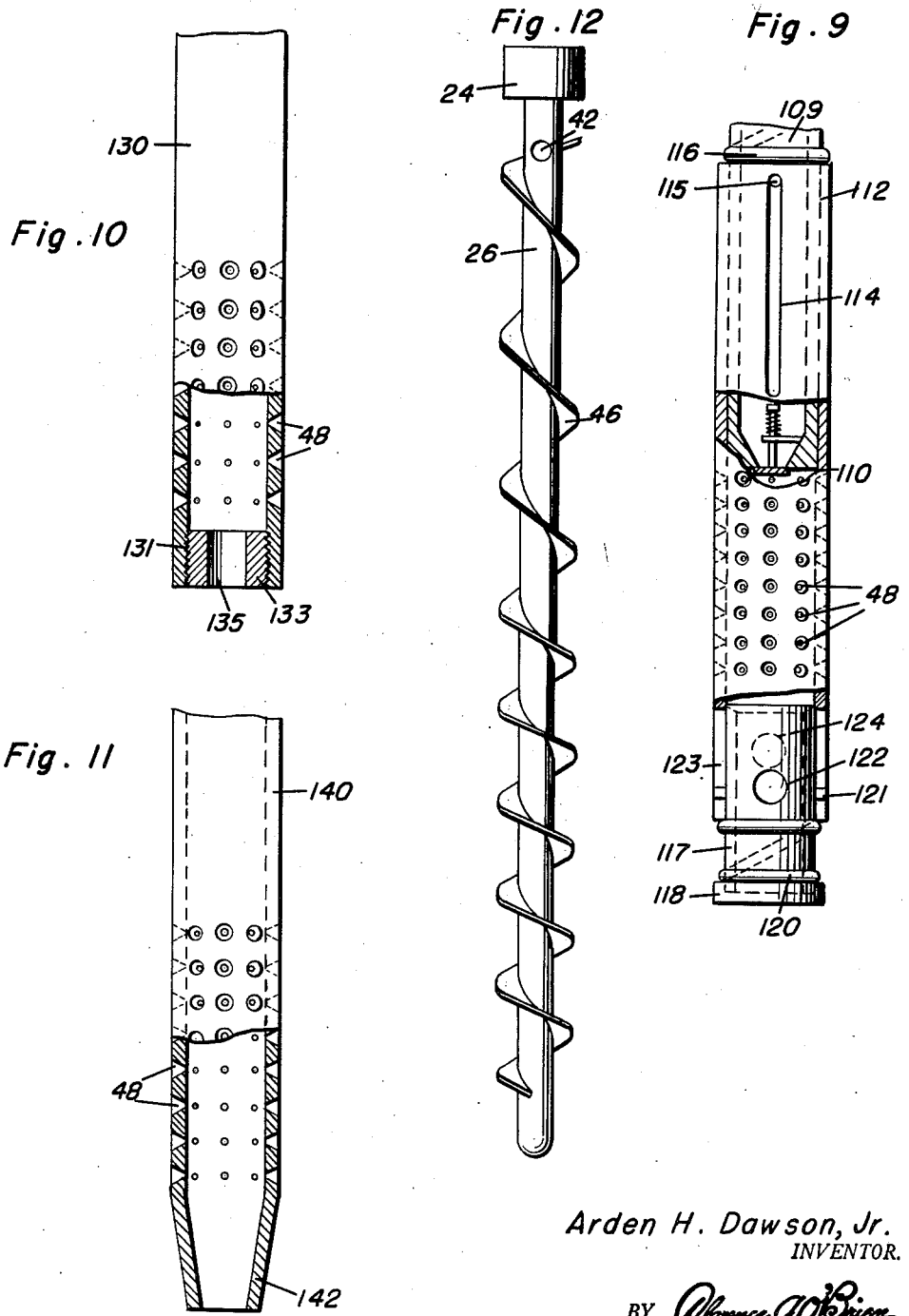

United States Patent Office 2,815,190
Patented Dec. 3, 1957

2,815,190

PROCESS AND APPARATUS FOR PREVENTING LOSS OF CIRCULATION OF DRILLING FLUID

Arden H. Dawson, Jr., Texhoma, Okla.

Application March 30, 1953, Serial No. 345,447

17 Claims. (Cl. 255—1.8)

This invention comprises novel and useful improvements in a process and apparatus for preventing loss of circulation of drilling fluids and more specifically relates to novel methods and apparatuses whereby lost circulation materials in the form of drilling mud additives may be mechanically introduced in relatively high concentrations at a region of a thief formation at which circulation losses are occurring.

The principal object of this invention is to provide a method and apparatus whereby concentrations of drilling mud additives, and in particular such concentrations which are in excess of those which are capable of being handled by conventional drilling fluid pumps, may be introduced into a well bore for sealing porous formations.

A further object of the invention is to provide a method and apparatus wherein the concentration of drilling mud additives in a drilling fluid, as delivered by conventional drilling fluid pumps into a mud circulation system, may be greatly increased at a predetermined region of a thieving formation to effect, by the increased concentration, a more efficient sealing action upon the porous formation.

Yet another object of the invention is to provide a process and apparatus in conformity with the foregoing objects wherein the concentration of a drilling mud additive or lost circulation material in a drilling fluid may be temporarily increased at a predetermined region of a well bore to effect a more efficient sealing of a porous or leaky formation therein.

An additional important object of the invention is to provide a method and apparatus whereby a constant flow at a uniform rate of a given concentration of a drilling mud additive in a drilling mud may be introduced into the circulating system and whereby, within the well bore, a quantity of the drilling mud additive may be concentrated and continuously or intermittently delivered in highly concentrated form to a predetermined portion of a well bore to seal porous formations therein.

A further primary and important object of the invention is to provide a process and apparatus whereby conventional drilling fluid pumps may be rendered effective to deliver considerably greater concentrations of drilling mud additives or lost circulation materials in a drilling fluid than have been heretofore possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a somewhat diagrammatic view, parts being broken away and shown in section, of a well bore showing an apparatus in accordance with the invention applied thereto;

Figure 3 is a vertical central sectional detail view, taken upon an enlarged scale, substantially upon the plane indicated by the section line 3—3 of Figure 2;

Figure 4 is a horizontal sectional detail view, taken upon an enlarged scale, substantially upon the plane indicated by the section line 4—4 of Figure 2;

Figure 6 is a view similar to Figure 2 but showing a third embodiment of the concentrating device, a part thereof being broken away;

Figure 7 is a view similar to Figure 2 but showing another or fourth embodiment of a concentrating device, a part thereof being broken away;

Figure 8 is a view of the embodiment of Figure 7 but showing the same in the position for discharging a concentration of drilling mud additives;

Figure 9 is a view similar to Figure 2 but showing still another or fifth embodiment of a concentrating device, a part thereof being broken away;

Figures 10 and 11 are views similar to Figure 2 showing still further sixth and seventh embodiments of the concentrating device, parts thereof being broken away; and, Figure 12 is a perspective view of the means for discharging concentrated loss circulation material from the concentrating devices of Figures 2, 5 and 6.

Figure 2:
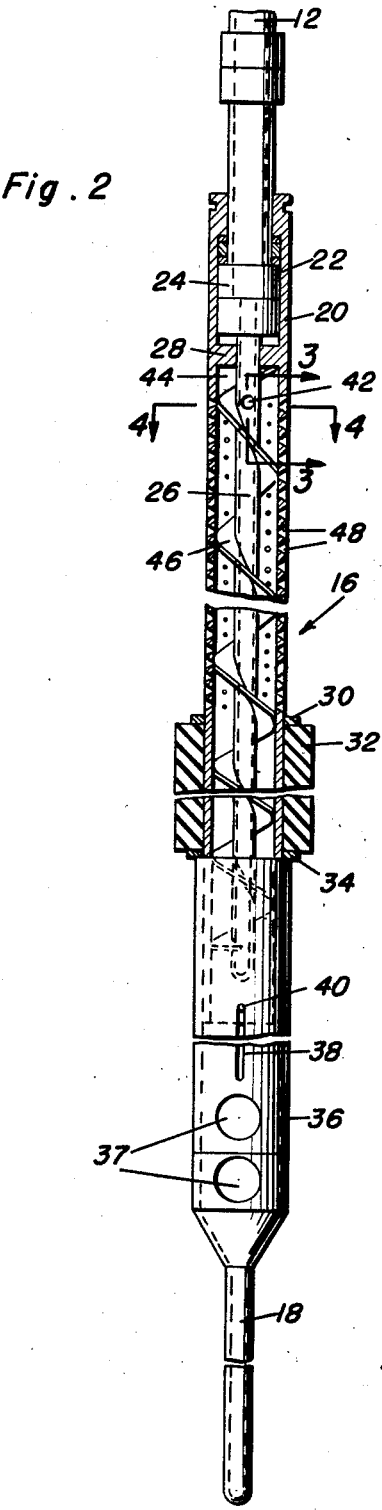
Figure 2 is an enlarged elevational view, parts being broken away and shown in vertical section of a concentrating device for increasing the concentration of drilling mud additives in drilling mud.

It is well known in the oil well drilling industry that the maintaining of a continuous circulation in the well bore of a drilling fluid, commonly known as "drilling mud," is essential for efficient and economical drilling operations. Further, it is common knowledge that the well driller is often confronted by serious problems resulting from two basic types of drilling fluid losses into formations penetrated by the well bore.

The first of these losses, commonly referred to as "water-loss" or "filtration" involves a relatively small, slow loss of the filtrate during filtration of a drilling fluid by certain finely porous, filter-like formations. "Water-loss" may be controlled almost as desired by regulating the composition or properties of the drilling fluid, thereby regulating the sealing action of the residue, commonly known as "wall-cake" which is deposited upon the filtering surface of such strata during this filtration process. The control of "water-loss" is very often extremely important, but practically no difficulty in maintaining circulation of drilling fluid is presented due to "water-loss."

The second type of loss, commonly referred to as "loss of circulation" or "lost returns" occurs due to penetration by the well bore of porous or leaky formations, sometimes called "thief formations" or "lost circulation zones," containing permeable pore-spaces, fractures, faults, fissures, cavities and the like which are relatively large, causing correspondingly large and rapid losses of drilling fluid. Loss of circulation may result due to permeable pore-spaces ranging in size from those immediately larger than will effectively filter dispersed colloidal material from a colloidal suspension or drilling fluid, as in the foregoing filtration process which results in water-loss, to very large caves and caverns which may contain migrating water or communicate with the atmosphere. Improper handling of drilling fluids or heavy muds may break down certain formations, compress unconsolidated strata or lift overburden to form cavities which cause loss of circulation. Loss of circulation is a problem in itself, but may result in a number of other fatal effects upon the well drilling operation.

In order to attempt to prevent loss of circulation, it has become customary to introduce drilling mud additives commonly known as lost circulation materials into the drilling mud for the purpose of sealing or clogging the porous, thief formations with such material and thereby prevent loss of the drilling fluid into such formations. Various materials have been employed for this purpose with varying degrees of success.

In general however, it is desirable to employ as great a concentration of the lost circulation materials in the drilling fluid as can be handled, by the pumps and other elements of the drilling mud circulating system, without excessive difficulty. Obviously, a greater concentration of the drilling mud additive at a leaky formation will more quickly and more certainly seal and plug the same, preventing further loss of circulation and permitting the normal drilling operation to be continued. However, in present systems for circulating drilling fluids, there are definite limits to the amounts or concentrations of lost circulation material which may be employed therein. Thus, an unduly high concentration of such material will tend to clog the pumps, and other elements of the system, necessitating shutdowns while the obstructions are cleaned therefrom. In general therefore, it may be stated that the concentration of the drilling mud additives in the drilling mud has a relatively constant limit imposed or determined by the characteristics of the mud pumps and other elements of the drilling fluid circulatory system.

The present invention aims to overcome these difficulties by devising a process and an apparatus whereby lost circulation material may be discharged in a well bore in concentrations which are independent of the capacities of the mud pumps, valves and other elements of a drilling fluid circulatory system.

A fundamental purpose of the invention, therefore, is to provide a process and apparatus whereby drilling mud additives in substantially any desired concentration may be discharged into and specifically directed to thief formations at any predetermined portion of a well bore.

Another basic purpose of the invention is to provide a process and apparatus whereby lost circulation material may be discharged in highly concentrated form at any region of a well bore for the purpose of sealing porous formations in that or any other region of the well bore.

Still another basic purpose of the present invention is to provide a process and apparatus whereby intermittent highly concentrated charges of lost circulation material may be intermittently and periodically discharged into a well bore for sealing porous formations therein, while the mud pumps maintain a continuous delivery of a drilling fluid which contains lost circulation material.

A still further basic purpose of the invention is to provide a process and apparatus, for sealing porous formations and preventing loss of circulation of drilling fluid thereto, which will permit circulation of drilling fluid and continuation of the drilling operation in conjunction therewith.

Reference is now made first to Figures 1–4 and 12 which show one satisfactory embodiment of apparatus for practicing the principles of this invention. The numeral 10 designates in general a drilling rig of any conventional design for operating a drilling string or pipe 12 which is positioned inside the well bore 14. At its lower end, the drill pipe 12 has swivelly attached thereto a concentrating device indicated generally by the numeral 16 and of a construction to be set forth hereafter, an anchor pipe 18 being disposed below and carried by the concentrating device. In the view of Figure 1, the drill pipe is shown as lowered in the well with the anchor pipe 18 resting upon the bottom of the same.

It should be understood that the concentrating device 16 may be disposed at any convenient position along the drill pipe 12 when sufficient anchor pipe 18 is employed to engage the bottom of the well.

Referring now more specifically to Figure 2, it will be apparent that the concentrating device indicated at 16 consists of a plurality of elements. Thus, there is provided a cylindrical or sleeve member 20 which in its upper end has a chamber 22 which slidably and rotatably receives a cylindrical member 24 which is secured to the lower end of the tubular drill stem 12 and also is fixedly secured to the upper end of an inner tubular member 26 which extends into the interior of the sleeve member 20. A suitable internal flange or guide 28 is provided for journaling the inner tubular member 26 within the upper end of the sleeve member 20 and performs other functions indicated hereinafter. At any convenient position adjacent its lower end, the sleeve member 20 has fixedly secured thereto an external flange or plate 30, and a formation packer 32 is movably positioned upon the sleeve member 20 below the flange or collar 30 and upon its lower surface is engaged by a movable collar member 34 which is slidable upon the exterior of the sleeve member 20.

Slidably received upon the lower end of the sleeve 20, is a lower casing member 36 to the lower end of which is secured the anchor pipe 18. A plurality of suitable outlet apertures 37 and a suitable longitudinal slot 38 are provided in the lower casing member 36 the slot receiving a pin 40 carried upon the exterior of the lowermost portion of the sleeve 20 whereby the member 36 is retained upon the sleeve 20 and prevented from relative rotation thereon but is allowed a limited vertical or axial movement with respect to the sleeve 20. The upper end of the lower casing 36 abuts the member 34 whereby when sufficient weight of the drill stem 12 rests upon the anchor pipe 18 upon the bottom of the well bore 14, this weight applied by the members 30 and 34 to the formation packer 32 will radially expand the latter, as shown in Figure 1, to cause engagement of the same with the walls of the well bore and thus prevent rotation of the packer and the exterior elements of the concentrator 16 which are fixedly attached thereto. If desired, the packer 32 may constitute a fluid tight seal in the well bore, although for the basic purpose of this invention it is sufficient that the packer shall prevent rotation of the sleeve 20 and hold the same stationary during rotation of the drill stem 12 and the inner tube member 26 as set forth hereinafter.

As will be more readily apparent from Figures 2 and 12, the inner tubular member 26 is provided in its upper portion with a suitable aperture or port forming an inlet 42 which opens into the interior of the sleeve 20 below the partition 28 therein. This inlet thus establishes communication between the interior of the drill stem 12 and the annular chamber or space 44 disposed between the sleeve 20 and the axially disposed tubular member 26 therein and also with the interior of the tubular member 36.

A spiral vane 46 constituting a spiral conveyor is integrally formed upon the tubular member 26 and extends throughout any desired portion of the length of the same, it being observed that this spiral conveyor 46 is of such size that its periphery will contact the inner surface of the tubular sleeve 20, while the pitch of the auger may progressively decrease from its upper to its lower end. It will be apparent that when the drill stem is rotated, the auger member 46 will rotate therewith within the chamber 44, constituting an impeller as set forth hereinafter.

The sleeve 20, as shown more clearly in Figures 3 and 4, is provided with a plurality of apertures or ports 48 therein. These apertures may be arranged in any desired pattern and over any desired portion of the cylindrical surface of the sleeve 20. They may be of any desired size or shape. Preferably however, these ports are funnel-shaped or conical, having their apex portions 50 opening into the interior of the sleeve 20 into the chamber 44, and having their discharge or base portion 52 disposed upon the exterior of the sleeve.

The operation of the apparatus as described above is as follows. By means of the mud pump and associated elements, not shown, drilling fluid containing lost circulation material or drilling mud additives is fed downwardly through the drill stem 12 and is discharged into the annular space 44 of the concentrator 16 through the inlet aperture 42 in the inner tubular member 26. The drilling mud additive, as referred to herein comprises any undissolved material capable of being mechanically screened from a drilling fluid, and is depicted in the drawings by the numeral 54. The drilling mud passes from the annular chamber 44 through the apertures 48 of the sleeve 20 and out of the concentrator 16 into the well bore 14. The reduced or apex inner ends of the ports 48 are of such size that although they will permit free passage of drilling fluid, they will oppose or restrict flow therethrough of the drilling mud additive. It will thus be seen that the sleeve 20 of the concentrator 16 functions as a screen for separating the lost circulation material from the drilling mud which is a fluid carrier therefor.

Consequently, as the additive is screened from and separated from the drilling mud, the additive is retained and concentrated in the chamber 44. As the inner tubular member 26 rotates, the auger screw 46 thereon will wipe across and clean the ported cylindrical interior surface of the sleeve 20. Further, the auger screw will feed the material downwardly through the sleeve 20 into the tubular member 36 and out of the concentrator 16 through the outlet apertures 37 which, preferably, are larger than or otherwise offer less resistance to the passage of concentrated lost circulation material than do the screening apertures 48. The screening action of the concentrator may be enhanced by the employment of a variable or other suitable resistance to flow at these outlet apertures 37, as set forth hereinafter. However, sufficient screening action at the screening apertures 48 may be obtained by the initial employment of conventionally high concentrations of lost circulation material in a low viscosity drilling mud, by pumping relatively large volumes of drilling fluid containing the drilling mud additive under similar high pressures into the concentrator 16, by the employment of an auger screw of decreasing pitch or incorporating other suitable resistances therein and although the screening apertures 48 offer more resistance to the passage of concentrated lost circulation material than the outlet apertures 37, they offer less resistance to flow of drilling fluid than do the outlet apertures 37 by virtue of being disposed higher in the concentrator 16 and nearer the mud pumps. The concentrator 16 may even be primed by manually plugging with lost circulation material before lowering the same into the well bore.

There will thus be a discharge from the concentrator 16 of highly concentrated lost circulation material which will move towards thief formations and more effectively seal the same.

It will be apparent that the principle of this invention contemplates the formation of ports 48 of different size in accordance with the various types of lost circulation material to be handled, and for this purpose interchangeable sleeves 20 may be provided having different size ports, or a sleeve may be provided having ports of adjustable area. The fundamental purpose of this invention, however, is to provide such an area of port that the same will constitute a screen for retaining and concentrating lost circulation material until the same is discharged through the outlet apertures 37 of the concentrator 16.

Figure 1 indicates at 54 a concentrated mass of loss circulation material as being discharged from the outlet apertures 37 in the tubular member 36 into the well bore for sealing porous formations and preventing loss of drilling mud therein.

The embodiment of apparatus described hereinbefore is equally susceptible to use with other arrangements. Thus, instead of the formation packer 32 securing the sleeve against rotation, an arrangement such as that illustrated in Figure 5 may be employed.

Thus, a sleeve 60 is provided which is identical with the sleeve 20 except that the formation packer 32, the fixed and movable flanges 30 and 34 and the lower casing sleeve 36 are omitted. At its lower end, the sleeve 60 is instead provided with serrations or teeth 62 which are adapted to engage the bottom of the well bore 14 and thus anchor the sleeve 60 against rotation in the well. However, this arrangement may also be employed above the bottom of the well when used in conjunction with anchor pipe 18, in which case the bottom of the anchor pipe will carry the serrations. The sleeve 60 is provided with the outlet apertures 37, for concentrated drilling mud additives, which are identical with the outlet apertures 37 in the tubular sleeve 36 as set forth hereinbefore. Received within the sleeve 60 is the inner tubular member 26, as previously described, and having the auger screw 46 thereon and the inlet aperture 42, together with the swivel consisting of the cylindrical member 24 rotatable within the chamber 22 disposed above the partition 28. The sleeve 60 is, of course, apertured at 48 in the same manner as the sleeve 20 and except for the means for preventing rotation of the sleeve, is in every respect identical with the sleeve 20. Accordingly, a further explanation of the operation of this arrangement is believed to be unnecessary.

Figure 5:
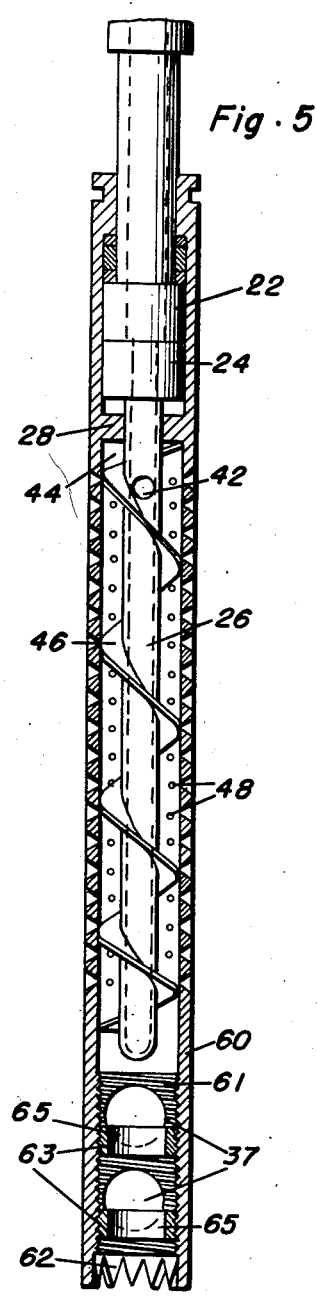
Figure 5 is a view similar to Figure 2 but of a second embodiment of the mud additive concentrating and discharging device.

In both of the embodiments of Figures 1–4 and of Figure 5, the concentrator is disposed on the lower end of the drill pipe near the bottom of the well or is used in conjunction with varied lengths of anchor pipe. However, as shown in Figure 6, it is possible to provide a form of concentrator which may be disposed at any desired elevation within a well bore without the use of anchor pipe and which is carried by the drill pipe as the latter hangs in the well bore.

Attention is directed more specifically to Figure 6 for a consideration of such an embodiment. In this figure there is illustrated a sleeve 70 which, as in the preceding embodiments has a cylindrical chamber 22 for rotatably and slidably receiving a cylindrical member 24 which is fixedly secured to the lower end of the drill pipe 12 and which is also rigidly secured to the upper end of the inner tube 26. The latter member is, of course, rotatably journaled in the partition 28 which divides the chamber 22 from the annular chamber 44 within the sleeve 70. The inner tubular member 26 is likewise provided with a discharge port 42 which is disposed within the chamber 44, and is also provided with the integral helical screw member 46 as in the preceding embodiments.

However, adjacent its lower end, below the funnel-shaped perforations 48, the casing 70 is provided with an expansible formation packer 72. The latter is retained between an annular external flange 74 on the lower end of the casing 70 and an upper flange 76. The packer 72 is provided with an annular chamber 78 therein which surrounds the lower end of the sleeve 70. A tubular U-shaped conduit 80 has its hollow legs communicating with the chamber 78 within the formation packer 72 and upon its midportion has a stationary upstanding tubular neck 82 which is swivelly received within the open lower end of the tubular member 26.

Thus, when the outlet course of the fluid from port 42 through the ports 48 is restricted or plugged as by the clogging with concentrated lost circulation material of the annular chamber 44, the pressure of the drilling mud from the interior of the drill pipe 12 is supplied to the stem 82 and to the conduit 80 and from thence into the chamber 78 for expanding, by hydraulic pressure, the packer 72 into engagement with the wall of the well bore, thereby holding the sleeve 70 against rotation. The member 72 is thus a pressure operated holding means which is intended to perform the same function as the packer 32 or the teeth 62 in the preceding embodiments.

The sleeve 70 is suitably opened at its lower portion to form the outlet port 84 for discharging the concentrated lost circulation material. The operation of the screw impeller 46 is identical with that of the preceding forms, the differences of this latest modification residing in the hydraulic holding means for preventing rotation of the casing 70, and the concept and structure whereby the concentrator may be disposed at any particular formation through which the well bore passes.

In all of the preceding embodiments it will be noted that the drill stem itself has been employed as a source of power for operating the screw impeller to compress and discharge the concentration of drilling mud additives from the concentrator unit. In Figures 7 and 8 there is disclosed a still further apparatus for performing the same general purpose. Thus there is provided a sleeve 90 which is adapted to be secured in any suitable way to the lower end of the above mentioned drilling stem 12. The lower end of the sleeve 90 is provided with previously mentioned ports 48, and an inner tubular member 92 is disposed axially and fixedly on the interior of the sleeve 90, being secured therein as by integral lugs or brackets 94. Adjacent its lower end, the tubular member 92 is provided with a partition 96 through which is slidably received a rod 98 having a piston 100 rigidly secured to the upper end of the same and slidable within the inner tube 92. A compression spring 102 is disposed within the member 92 below the piston 100 and above the partition 96 for yieldingly urging the piston rod into its uppermost position as shown in Figure 7. The lower end of the rod 98 is screw threaded to adjustably receive the hub 104 of a closure valve 106 for closing the open lower end of the sleeve 90. A lock nut 108 is employed to maintain the valve in an adjusted position upon the rod 98.

In this form of the invention the spring 102 normally retains the valve in closed position whereby the lost circulation material passing down the drill stem into the upper end of the sleeve 90 will accumulate and become concentrated in the perforated lower end of the sleeve 90 above the closed valve member 106. This concentration will continue as the drilling mud passes through the ports 48, leaving the larger particles of lost circulation material within the sleeve. As this collection of material begins to clog and reduce the area of the ports 48 through which the drilling mud passes, the pump pressure upon the drilling fluid will increase until such time as the valve 106 is opened by this increasing pressure against the resistance of the spring 102 as shown in Figure 8. It will thus be apparent that the pressure will continuously increase until such time as the same is sufficient to open the valve, whereupon the concentrated mass of lost circulation material will be intermittently discharged in slugs or batches. In this form of the apparatus, the concentration and quantity of material discharged and the frequency of the discharging operations is regulated by the pumping pressure and volume and the compression of the spring 102, the latter being adjustable as to its strength by varying the position of the hub 104, valve 106 and nut 108 upon the threaded end of the rod 98.

Still another form of intermittently discharging concentrating device is disclosed in Figure 9. In this form, the attachment 109 on the lower end of the drill stem 12 terminates in a spring closed check valve 110 and is provided with a sleeve 112 slidable thereon which has a suitable longitudinal slot 114 in which is engaged a pin 115 carried by the extension or attachment 109, this pin permitting a limited longitudinal movement of the sleeve 112 but preventing rotation of same relative to the drill stem. A compression spring 116 may be secured to the drill stem extension 109 in any suitable manner and at its lower end bears against the upper end of the sleeve 112 for urging the latter downwardly upon the drill stem extension 109 as shown in Figure 9.

Below the end of the drill stem extension 109 which contains the non-return check valve assembly 110, the sleeve 112 is provided with the usual funnel-shaped or conical perforations 48 previously described. Slidably received within the open lower end of the sleeve 112 is a cylindrical plunger 117 having an externally flanged closed lower end 118 and a compression spring 120 interposed between this flange and the bottom of the sleeve 112. This spring urges the plunger 117 downwardly with respect to the sleeve 112. Movement of the plunger is limited by pins 121 and longitudinal slots 123 similar to 115 and 114 as previously described.

The plunger 117 is provided with a port or set of ports 122 which is adapted to move into and out of register with corresponding ports 124 formed in the lower end of the sleeve 112. The arrangement is such that when the plunger 117 is forced inwardly of the sleeve 112, the ports 122 and 124 will register whereby the interior of the sleeve will be discharged or vented through the aligned ports into the well bore. However, when the plunger is moved outwardly of the sleeve 112 under the influence of the spring 120, the ports are moved out of registry, whereby the funnel-shaped apertures 48 will constitute the only means of exit from the sleeve 112.

In this arrangement, the drilling mud including the lost circulation material will be introduced through the interior of the drill stem 12 and the extension 109 into the interior of the sleeve 112. The drilling mud will pass through the apertures 48 being strained therefrom and leaving behind the larger particles of the lost circulation material. This latter material will accumulate and collect in the chamber between the valve assembly 110 and the closed bottom end of the plunger 117. At suitable selected intervals, either controlled automatically or manually as desired, the drill stem may be lowered until the plunger 117 or an attached length of anchor pipe, not shown, rests upon the bottom of the well, and until the weight of the drill stem causes the plunger 117 to move inwardly of the sleeve 112 against the spring 120. When this occurs, the ports 122 and 124 being in registration, the lost circulation material will be discharged through these ports 122 and 124 by the forcing action of the downward movement of the drill pipe extension 109 and attached check valve assembly 110 against the upper compression spring 116 together with the hydraulic pressure exerted by the mud pumps.

Thus, a highly concentrated mass or batch of the drilling mud additive is discharged into the well bore for treating leaky formations. As soon as the drill stem is lifted, however, the spring 120 will close the ports 122 and 124, the upper spring 116 will force the sleeve 112 downward with respect to the drill pipe extension 109 and attached check valve assembly 110 thereby reexposing the cleaned screening apertures 48 for repeating the straining phase of the operation. The weight of any anchor pipe which may be employed will assist the springs 120 and 116 in performing this function of resetting the device.

Shown in Figure 10 is a basic form of concentrating device which illustrates the fundamental principles of the invention and which consists of a section of pipe 130 of any length, open at both ends and perforated with any number of screening apertures 48 of any size or shape. The concentrator, as shown in the figure, employes the previously mentioned, preferred, conical apertures 48 which will efficiently screen lost circulation material from a drilling fluid and which are less likely to become clogged with the drilling mud additive. It should be understood that very high concentrations of lost circulation material may be obtained and effectively used to seal porous thief formations by the employment of this basic concentrator.

When this concentrating device is attached to and included between an upper and a lower section of drill pipe conventionally disposed within a well bore, thereby forming a perforated section of the drill stem and drilling fluid is pumped into the string, which is open at its lowermost end, the drilling mud will tend to follow the course of least resistance through the screening apertures 48 since more pressure is required to pump the same out the lowermost open end of the drill stem. Therefore, should the drilling fluid contain lost circulation material, it is obvious that the drilling mud additive may be screened from the drilling fluid, retained and concentrated within the string as the drilling mud leaves the device through the screening apertures 48.

It is readily apparent that the efficiency of this screening and concentrating action may be increased by increasing the area of port of the screening apertures 48, thus decreasing the resistance to flow through the same. This may be accomplished by increasing the number of apertures 48 or the size thereof. The screening and concentrating action may also be augmented by increasing the resistance to flow below the screening apertures 48 as by placing the concentrator higher in the drill string or including a suitable restriction below the concentrator as set forth more fully hereinafter. Such restriction may also be in the form of a suitable drill bit which will permit the drilling operation during the employment of a concentrating device.

As the concentration of lost circulation material is formed by this arrangement, it is forced downwardly through the lower section of drill pipe, which is disposed below the concentrator, and out through the open lowermost end of the drill string into the well bore by the hydraulic pressure exerted by the mud pumps.

It will be noted that as the lower section of drill pipe, which is disposed below the concentrator, becomes filled with the downwardly moving highly concentrated lost circulation material the resulting friction will constitute a resistance below the screening apertures 48 and augment the screening and concentrating action as previously described. Therefore, the efficiency of this arrangement is necessarily limited to the pressures available for discharging the concentrated drilling mud additive out of the string through the outlet at its open lowermost end. Otherwise, the whole lower section of the string may become plugged with the concentration, requiring operations to be discontinued. However, this form of concentrating device may not only be placed at any position within the pipe string, but may be attached at the lowermost end of the same.

Figure 11 further illustrates the embodiment of Figure 10, but indicates a sleeve 140 having a restriction 142 of any form below the screening apertures 48 for increasing the efficiency of the screening and concentrating action previously explained.

Reference has been made hereinbefore to provision for the adjustable restricting or throttling of flow of the concentrated lost circulation material through the discharge apertures of the various embodiments of apparatuses disclosed herein. It should be understood that the present invention, both as to process and apparatus, is not restricted to the use of any particular type of flow restricting device, but comprehends broadly the provision of any means whereby such flow may be adjustably and variably restricted and controlled. Solely for illustrating two possible types of flow restrictors which may be satisfactorily employed in the various forms of apparatus specifically set forth herein, there is illustrated in Figures 5 and 10 two flow restrictors of the preset adjustable type.

Attention is now directed to Figure 5 wherein it will be observed that the lower end of the sleeve 60, whether open or closed, is internally threaded at 61, these threads preferably extending from above the uppermost outlet aperture 37 to below the lowermost aperture. One or more externally threaded sleeves or rings 63, engaged in the threads 61, are provided with control passages 65 therethrough, which may be of such size as to impart substantially no resistance to flow therethrough, or alternatively may be of such predetermined size as to effect any desired resistance to flow therethrough. By adjustment of the rings axially of the member 60, the upper and/or lower edges of the rings may be caused to mask or obstruct the area of the outlet openings 37 to any desired extent, thereby effecting a variable adjustable restricting of flow through the discharge apertures. In this form of restrictor, the axial adjustment will be made before the concentrating device is lowered into the well bore.

The form of flow restrictor illustrated in Figure 5 may obviously be readily included in the embodiments of the concentrating devices disclosed in Figures 1-4. It may also be incorporated into the apparatus of Figure 9 by screw threadly engaging the rings 63 in the plunger 117 for controlling the ports 122 thereof.

Figure 10 exhibits a different construction of flow restrictor wherein the open lower end of the sleeve 130 is internally threaded at 131 to receive the externally threaded plug 133 which is centrally bored or apertured at 135. In this type of restrictor the aperture 135 is of a predetermined area and it is contemplated that plugs of different areas of aperture may be interchangeably inserted in the sleeve 130 to vary the flow through the open bottom end of the sleeve which is the discharge aperture thereof.

The form of restrictor of Figure 10 is likewise of the preset adjustable type, being applied prior to lowering of the concentrating device in the well bore. This restrictor may be included in any of the concentrating devices of Figures 6, 7 and 11.

From the above description in conjunction with the drawings, it is believed that the construction and operation of the different forms of apparatuses in accordance with this invention will be readily understood and further explanation is believed to be unnecessary.

The process of preventing loss of circulation in accordance with this invention is carried out by the various forms of apparatus disclosed herein and consists of the following steps.

The first step consists of the lowering of a screening concentrator to any desired position within a well bore, preferably at a region for most effective use, by means of the drill pipe or other suitable conduit.

The second step in the process is to feed drilling fluid containing a drilling mud additive which is capable of being screened therefrom, through the drill pipe or other desirable conduit into the screening device by the employment of conventional mud pumps or other suitable means.

The third step of the process is to concentrate the drilling mud additive and retain the same within the device by causing the drilling fluid to pass through screening apertures, which are incorporated into the device, thereby screening or straining that lost circulation material from the drilling fluid as the latter passes through such apertures.

The fourth step of the process is the discharging of the concentration of drilling mud additive or lost circulation material from the screening concentrator, through an outlet course or port which is larger than or otherwise offers less resistance to the passage of such a concentration than the previously mentioned screening apertures, into the well bore by the employment of an auger, hydraulic pressure or other suitable means, thus providing relatively high concentrations of lost circulation material for more effectively sealing thief formations therein and preventing loss of circulation of drilling fluid thereto.

The fifth step in the process includes the intermittent or continuous providing of the required supply of concentrated lost circulation material and the necessary further directing or forcing of the same into thief formations for obtaining the desired results.

A corollary to the above steps is the providing of concentrated lost circulation material for sealing porous formations during the drilling operation by the employment of a concentrating device in conjunction with a drill bit or cutting head, said employment being such that circulation of a drilling fluid may be permitted.

What is claimed as new is as follows:

1. A method of preventing lost circulation of drilling fluid from a well bore into a porous formation which comprises, circulating through a well bore a drilling fluid having lost circulation material admixed therewith, removing a portion of the drilling fluid from the mixture to thereby increase the concentration of lost circulation material in a portion of the mixture while said portion is being moved through said well bore and applying said concentrated portion to a porous formation.

2. The method of claim 1 wherein said step of applying is effected intermittently.

3. A method for preventing lost circulation of a drilling fluid from a well bore into a porous formation which comprises introducing a drilling fluid having lost circulation material admixed therewith into a pipe disposed in a well bore, circulating said fluid through a well bore and subsequently withdrawing the same therefrom, removing a portion of the drilling fluid from the mixture to thereby increase the concentration of lost circulation material in a portion of said drilling fluid within said pipe, applying said concentrated portion to a porous formation.

4. The method of claim 3 wherein the drilling fluid has lost circulation material admixed therewith in a constant proportion.

5. A method for preventing lost circulation of a drilling fluid from a well bore into a porous formation which comprises introducing a drilling fluid having lost circulation material admixed therewith into a pipe disposed in a well bore, circulating said fluid through the well bore and subsequently withdrawing the same therefrom, straining a portion of the admixed drilling fluid and lost circulation material during its passage through said pipe thereby removing a portion of the drilling fluid from the drilling fluid having the lost circulation material admixed therewith to thereby increase the concentration of lost circulation material in the remainder of the drilling fluid, applying said concentrated remainder to a porous formation.

6. A method for preventing lost circulation of a drilling fluid from a well bore into a porous formation which comprises introducing a drilling fluid having lost circulation material admixed therewith into a pipe disposed in a well bore, circulating said fluid through the well bore and subsequently withdrawing the same therefrom, straining a portion of the admixed drilling fluid and lost circulation material during its passage through said pipe thereby removing a portion of the drilling fluid from the drilling fluid having the lost circulation material admixed therewith to thereby increase the concentration of lost circulation material in the remainder of the drilling fluid, intermittently applying said concentrated remainder to a porous formation.

7. A method for preventing lost circulation of a drilling fluid from a well bore into a porous formation which comprises introducing a drilling fluid having lost circulation material admixed therewith into a pipe disposed in a well bore, circulating said fluid through the well bore and subsequentlywithdrawing the same therefrom, straining a portion of the admixed drilling fluid and lost circulation material during its passage through said pipe thereby removing a portion of the drilling fluid from the drilling fluid having the lost circulation material admixed therewith to thereby increase the concentration of lost circulation material in the remainder of the drilling fluid, applying said concentrated remainder to a porous formation, compressing the lost circulation material in the drilling fluid concurrently with the step of straining a portion of the drilling fluid.

8. The method of claim 3 including establishing a seal in the well bore above the porous formation, said concentrated portion of the mixture being discharged from said pipe into said well bore below said seal.

9. The method of claim 5 including establishing a seal in the well bore above the porous formation, the step of discharging the removed portion of the drilling fluid into the well bore above the seal and the step of discharging the concentrated remainder into the well bore below the seal.

10. The method of claim 5 including compressing the lost circulation material in the drilling fluid concurrently with the step of straining a portion of the drilling fluid, establishing a seal in the well bore above the porous formation, discharging the removed portion of the drilling fluid into the well bore above the seal and discharging the concentrated remainder into the well bore below the seal.

11. The method of claim 3 including the step of applying a predetermined resistance to flow of the concentrated portion from the pipe.

12. A method for preventing lost circulation of a drilling fluid from a well bore into a porous formation which comprises introducing a drilling fluid having lost circulation material admixed therewith into a pipe disposed in a well bore, circulating said fluid through the well bore and subsequently withdrawing the same therefrom, straining a portion of the admixed drilling fluid and lost circulation material during its passage through said pipe thereby removing a portion of the drilling fluid from the drilling fluid having the lost circulation material admixed therewith to thereby increase the concentration of lost circulation material in the remainder of the drilling fluid, applying said concentrated remainder to a porous formation, the step of applying a predetermined resistance to flow of the concentrated portion from the pipe.

13. A mud additive concentrating device for a drill pipe comprising a casing mounted upon a drill pipe for relative rotation thereon, inlet means for said casing operatively connected with the interior of said drill pipe, liquid discharge means and a concentrate discharge means in said casing, the liquid discharge means being interposed between the inlet means and the concentrate discharge means, a spiral conveyor in said casing for forcibly feeding material from said inlet means past said liquid discharge means and to said outlet means.

14. A mud additive concentrating device for a drill pipe comprising a casing mounted upon a drill pipe for relative rotation thereon, inlet means for said casing operatively connected with the interior of said drill pipe, liquid discharge means and a concentrate discharge means in said casing, the liquid discharge means being interposed between the inlet means and the concentrate discharge means, a spiral conveyor in said casing for forcibly feeding material from said inlet means past said liquid discharge means and to said outlet means, including means for controlling flow through said outlet means.

15. A mud additive concentrating device for a drill pipe comprising a casing mounted upon a drill pipe for relative rotation thereon, inlet means for said casing operatively connected with the interior of said drill pipe, liqud discharge means and a concentrate discharge means in said casing, the liquid discharge means being interposed between the inlet means and the concentrate discharge means, a spiral conveyor in said casing for forcibly feeding material from said inlet means past said liquid discharge means and to said outlet means, means for holding said casing stationary and means operatively connecting said auger to said drill pipe for rotation thereby.

16. A method of preventing lost circulation of drilling fluid in a well bore into a porous formation which comprises introducing into a well bore through a drill string a drilling fluid having a lost circulation material admixed therewith and circulating the same through a well bore and into contact with the porous formation, causing by the rotation of the drill string the removal of a portion of the drilling fluid from said mixture thereby effecting an increase in the concentration of the lost circulation material in a portion of the drilling fluid and introducing said portion into the well bore.

17. The method of claim 16 wherein said drill string is raised and lowered to vary vertically in the well bore the place at which said portion is introduced.

References Cited in the file of this patent

UNITED STATES PATENTS

| Number | Name | Date |
|---|---|---|
| 722,632 | Rothe | Mar. 10, 1903 |
| 985,862 | Turner et al. | Mar. 7, 1911 |
| 1,527,911 | Patti | Feb. 24, 1925 |
| 1,716,925 | Loomis | June 11, 1929 |
| 1,772,262 | Naugle | Aug. 5, 1930 |
| 1,807,082 | Boynton | May 26, 1931 |
| 2,079,517 | McQuiston | May 4, 1937 |
| 2,187,895 | Sanders | Jan. 23, 1940 |
| 2,207,334 | Reynolds et al. | July 9, 1940 |
| 2,419,545 | Gray et al. | Apr. 29, 1947 |
| 2,609,744 | Rietz | Sept. 9, 1952 |
| 2,634,098 | Armentrout | Apr. 7, 1953 |
| 2,652,117 | Arendt et al. | Sept. 15, 1953 |